O. F. TRIPP.

Knit Mittens.

No. 5,802. Reissued March 24, 1874.

Witnesses,

Abiel Lotta
C C Peavy

Inventor,

Othniel F. Tripp

A.M. PHOTO-LITHOGRAPHIC Co. N.Y. (OSBORNE'S PROCESS.)

UNITED STATES PATENT OFFICE.

OTHNIEL F. TRIPP, OF BATTLE CREEK, MICHIGAN.

IMPROVEMENT IN KNIT MITTENS.

Specification forming part of Letters Patent No. 142,301, dated August 26, 1873; reissue No. 5,802, dated March 24, 1874; application filed October 27, 1873.

*To all whom it may concern:*

Be it known that I, OTHNIEL F. TRIPP, of Battle Creek, county of Calhoun, State of Michigan, have invented an Improvement in Machine-Knit Mittens, of which the following is a specification:

The object of this invention is to produce a new and useful machine-knit double mitten, having the hand composed of an inner and outer web of corresponding thickness, connected together in several places by stitches, and united together, at their upper termination, in a single web of greater or less length, forming a single portion for the wrist, all substantially as hereinafter described.

Figure 1:
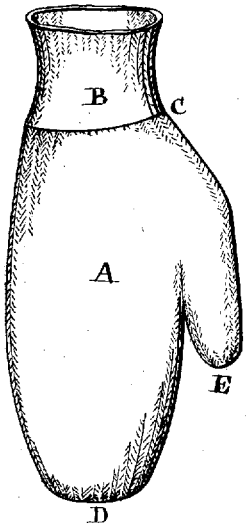
Figure 2:
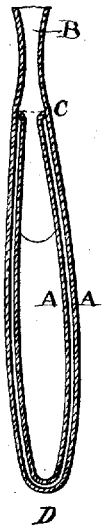

Figure 1 shows the mitten as a whole. Fig. 2 is a longitudinal section, in which A A show the inner and outer thicknesses, C their termination, and B the single portion forming the wrist. D and E, Fig. 1, show the tips of the finger and thumb portions of the mitten, and A in Fig. 1 represents all that portion of the mitten below the point C. All that portion of the mitten represented by A in Fig. 1 is composed of an inner and an outer thickness, both of which are alike, and are knit throughout by machinery in the ordinary or any well-known way, the inner being as complete as the outer. These two thicknesses are arranged one within the other either by hand or machine, and are also connected together, by stitches, at the points D and E, and united together at their upper termination C in a web of one thickness, of greater or less length, forming a single portion for the wrist.

All the parts are thus connected to prevent displacement while being reversed or drawn on or off the hand. Otherwise, the inner and outer thicknesses remain separate, one within the other, thus completing the mitten, which combines both usefulness and novelty in its production, and is manufactured, as herein specified, for the purpose of being worn double, and as a convenient reversible mitten.

I claim as my invention—

A machine-knit double mitten having the hand composed of an inner and outer web of corresponding thickness, connected together in several places by stitches, and united together at their upper termination in a single web, of greater or less length, constituting a single portion for the wrist, all substantially as and for the purpose described.

OTHNIEL F. TRIPP.

Witnesses:

ALFRED LATTA,

C. C. PEAVEY.